March 29, 1938.  E. J. REH  2,112,659

METHOD OF MAKING LENSES

Filed May 2, 1934

EDWARD J. REH
INVENTOR

BY
ATTORNEY

Patented Mar. 29, 1938

2,112,659

UNITED STATES PATENT OFFICE

2,112,659

METHOD OF MAKING LENSES

Edward J. Reh, Rochester, N. Y., assignor to Bausch & Lomb Optical Company, Rochester, N. Y., a corporation of New York Application May 2, 1934, Serial No. 723,487

7 Claims. (Cl. 49—82.1)

This invention relates to the method of making fused multifocal lenses and more particularly to fused multifocal lenses embodying a fused composite button.

One of the objects of this invention is to provide an improved method of making fused multifocal lenses embodying a fused composite button. Another object is to provide an improved method for fusing a composite button formed of a plurality of pieces of glass onto a seat on a major blank of glass. A further object is to provide a method of fusing a composite button in a countersink without distortion of the segment of glass having the lower softening point. Still another object is to provide a method of making multifocal lenses of the type described which comprises substantially confining the button and applying pressure thereto during the fusing operation. Another object is to provide a method of making multifocal lenses of the type described which comprises partially insulating against heat, during fusion of the button in the countersink, the glass of the button having the lower softening point. These and other objects and advantages reside in certain novel features of the methods, steps and processes as will hereinafter be more fully described and pointed out in the appended claims.

Referring to the drawing.

Figure 10:
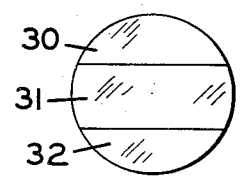
Fig. 10 is a face view of still another type of composite button.

Preferred methods of practicing my invention are illustrated in the drawing wherein 20 indicates a carrier button of glass having a perforation 21 extending therethrough. A segment of glass 22, having a higher refractive index than button 20, is fused in the perforation 21 and one side is ground and polished as at 23 to provide the composite button of Fig. 4. Another type of composite button can be made by forming a depression 24 in a carrier button of glass 25 and fusing therein the segment 22, having a higher refractive index than the button 25. One side is then ground and polished as at 26 to provide the composite button of Fig. 7. Another type of composite button can be provided by edge fusing two pieces of glass 27 and 28 of different refractive indices as shown in Fig. 8. One side is provided with the ground and polished surface 29. Still another type of composite button can be provided by edge fusing three pieces of glass 30, 31 and 32, as shown in Fig. 10, with the pieces 30 and 32 having the same refractive index which is less than the refractive index of piece 31. A ground and polished surface 33 is provided on one side of the composite button.

Figure 12:
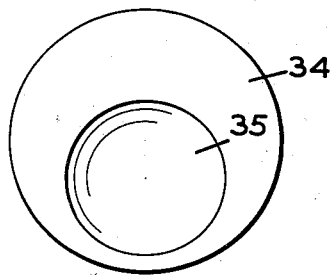
Fig. 12 is a face view of a major blank having a countersink.

These and other types of composite buttons, all well known in the art, are fused into ground and polished countersinks on the surfaces of major blanks to provide lens blanks which are then ground and polished to provide finished multifocal lenses. Such a major blank of glass 34, having a ground and polished countersink 35, is shown in Fig. 12. The major blank 34 is made of crown glass, for example, and has the same refractive index and coefficient of expansion as the carrier buttons and parts 20, 25, 27, 30 and 32. The reading segments or inserts 22, 28 and 31 are formed of glass, such as flint or barium crown glasses, having a higher refractive index than the major member but a lower softening point.

Figure 11:
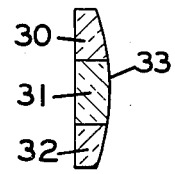
Fig. 11 is a vertical section of same.

When such composite buttons are fused into countersinks in major blanks of glass, under the prior art practice, certain difficulties are experienced. In the case of composite buttons of the type shown in Figs. 4, 9 and 11 the top of the segment 22, 28 or 31 is exposed and unprotected so that all parts of the composite button are subjected to the same heat. Since the segment has the lower softening point, the result is that the segment drops down into the countersink first and later when the portions 20, 27, 30 or 32 soften and drop into the countersink small amounts of air are entrapped so that bubbles are formed and the lens blank is rendered defective. When composite buttons such as shown in Figs. 9 and 11 are fused into countersinks, under the prior art methods, the segments 28 and 31 are not constrained in any manner and hence may, while fusing, expand and flow outwardly so that the originally determined and desired segment sizes and shapes are not provided and the dividing lines become distorted.

Figure 15:
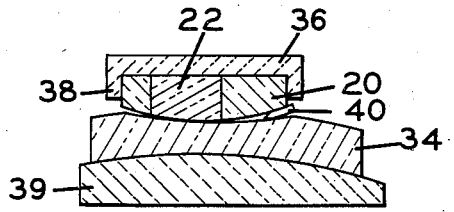
Fig. 15 shows the composite button of Fig. 4 and assembled parts ready for fusing in accordance with my invention.
Figure 16:
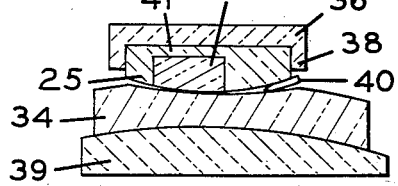
Fig. 16 is a similar view with the composite button of Fig. 7 in position.
Figure 17:
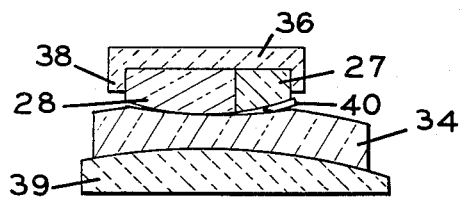
Fig. 17 is a similar view with the composite button of Fig. 9 in position.

By the practice of my invention, however, I am able to overcome these difficulties and produce properly fused lens blanks embodying composite buttons such as disclosed in the drawing. In a preferred method of practicing my invention a cup-shaped member 36 is placed on top of the composite button as shown in Figs. 15, 16 and 17. The member 36 is preferably made of refractory material, such as clay or any other suitable material which does not adhere to the softened glass. The member 36 has a recess 37 so that when in position on the button the depending edge or wall 38 extends down around the button. The recess 37 is of such diameter or size that it fits snugly down over the button. As shown in Figs. 15, 16 and 17 the major blank 34 rests on the usual refractory clay block 39 and a small pin 40 is placed under one edge of the button so as to properly locate the point of contact between the button and countersink as will be understood by those skilled in the art. The blanks, buttons and parts are assembled as shown in Figs. 15, 16 and 17 and then are subjected to fusing temperatures in a suitable furnace according to well known practices.

Figure 1:
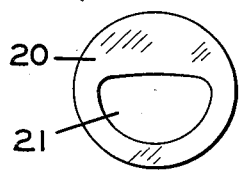
Fig. 1 is a face view of one type of carrier button used in making lenses by my method.
Figure 2:
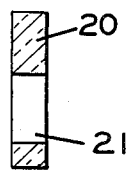
Fig. 2 is a vertical section of same.
Figure 3:
Fig. 3 is a face view of the segment insert.
Figure 4:
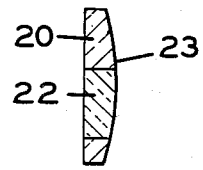
Fig. 4 is a sectional view of the composite button.
Figure 5:
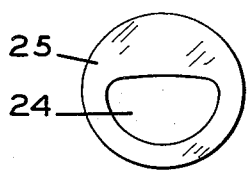
Fig. 5 is a face view of another type of carrier button.
Figure 6:
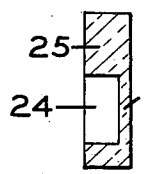
Fig. 6 is a vertical section of same.

In Fig. 15 I have shown a composite button of Fig. 4 assembled for fusion in accordance with my invention. The refractory member 36 acts as an insulator to protect the top of the segment 22 against direct heat so that the segment does not get too soft and fall down into the countersink too soon and produce air bubbles. The member 36 also serves to add weight or pressure to the button so as to insure an intimate contact between the softened glass and the countersink.

Figure 9:
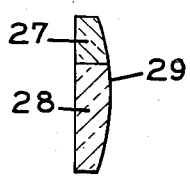
Fig. 9 is a vertical section of same.
Figure 13:
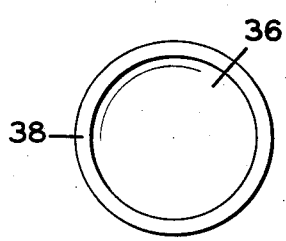
Fig. 13 is a face view of the cup-shaped refractory member used in practicing my invention.
Figure 14:
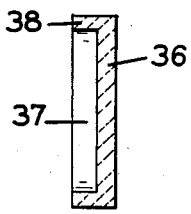
Fig. 14 is a central section of same.

In Fig. 17 I have shown a composite button of Fig. 9 assembled for fusion in accordance with my invention. In this case, the member 36 retains the parts and prevents them from spreading and becoming distorted while fusing. The member 36 also acts to insulate the top part of segment 28 against heat and also adds pressure or weight to the button so that the button is properly fused and entrapped air bubbles are obviated.

Figure 7:
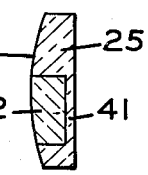
Fig. 7 is a sectional view of the finshed composite button.
Figure 8:
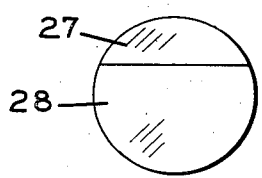
Fig. 8 is a face view of another type of composite button.

In Fig. 16 I have shown the composite button of Fig. 7 assembled for fusion in accordance with my invention. With this type of button, the floor 41 of the depression, if thick enough, serves to insulate the top of segment 22 against direct heat and if the floor 41 is thick enough it also provides weight or pressure on the button. By using my refractory member 36, however, the floor 41 of the depression can be relatively thin since the member 36 adds pressure and serves as a heat insulator. If the floor 41 is made relatively thin, a saving of glass is, of course, effected. Furthermore, the use of a thin floor 41 means that there will be less glass to grind away in finishing the lens, since the floor must be ground away before the lens is finished.

From the foregoing it will be apparent that I am able to attain the objects of my invention and provide improved methods for fusing composite buttons in major blanks for producing multifocal lenses. Various modifications can obviously be made without departing from the spirit of my invention.

I claim:

1. A method of making multifocal lenses which comprises forming a composite button by fusing together a plurality of pieces of glass having different softening points, placing said button in a countersink in a major blank of glass, substantially confining the button by placing on the top thereof a cup-shaped member of refractory material and subjecting the assembled blank, button and member to a fusing temperature.

2. A method of making multifocal lenses which comprises forming a composite button by fusing together a plurality of pieces of glass having different softening points, placing said button in a countersink in the top of a major blank of glass, surrounding and closely confining the edges of said button with refractory material and subjecting the assembled parts to a fusing temperature.

3. A method of making multifocal lenses which comprises forming a composite button by fusing together two pieces of glass of different refractive indices and fusing said composite button in a countersink in the top of a major blank of glass while applying pressure across the entire area of the top of said button.

4. A method of making multifocal lenses which comprises forming a composite button by fusing together two pieces of glass of different refractive indices and fusing said button in a countersink in the top of a major blank of glass while closely confining said button and applying pressure across the entire area of the top of the button.

5. A method of making multifocal lenses which comprises forming a composite button by fusing together a plurality of pieces of glass of different refractive indices, and fusing said button in a countersink in the top of a major member of glass while partially insulating said button against heat.

6. A method of making multifocal lenses which comprises forming a composite button by fusing a segment of glass in a hole in a disk of glass of different refractive index and fusing said button on top of a major blank of glass while restraining the button against distortion, applying pressure to it and insulating the segment against heat.

7. A method of making multifocal lenses which comprises providing a composite button by forming a perforation through a disk of glass and fusing in said perforation a segment of glass of different refractive index, placing the button in a countersink in the top of a major blank, both confining said button and applying pressure thereto with refractory material while subjecting the blank and button to fusing temperature.

EDWARD J. REH.